Patented July 23, 1946

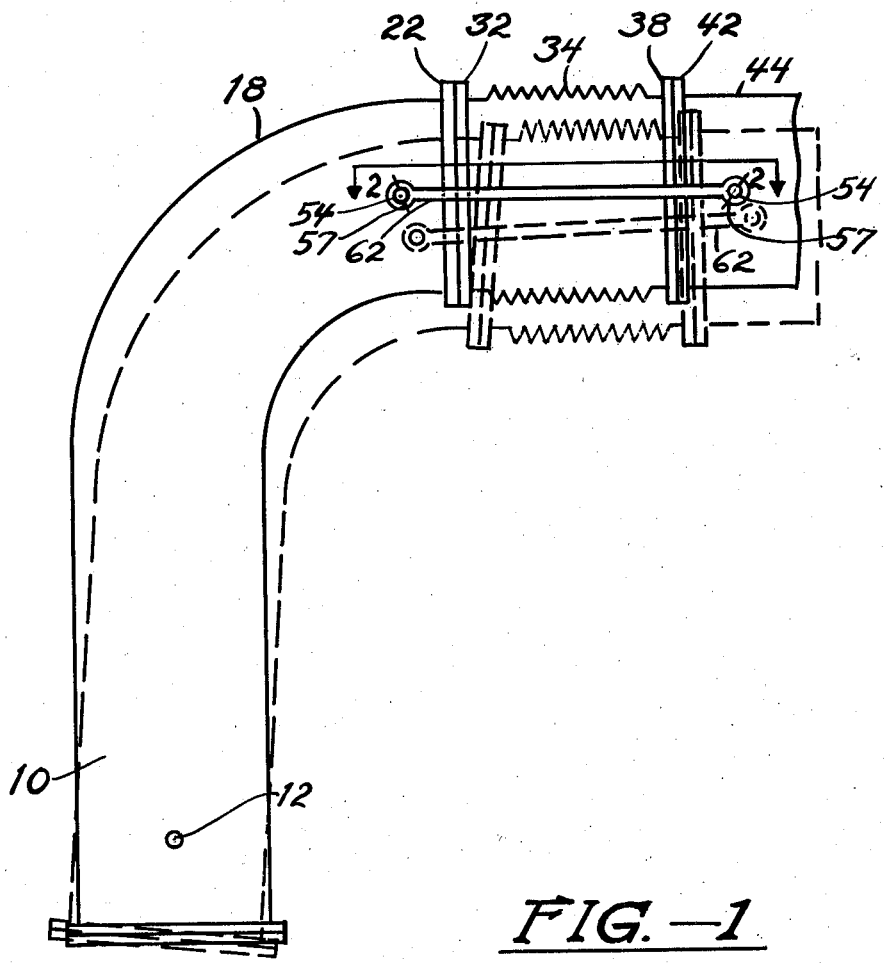

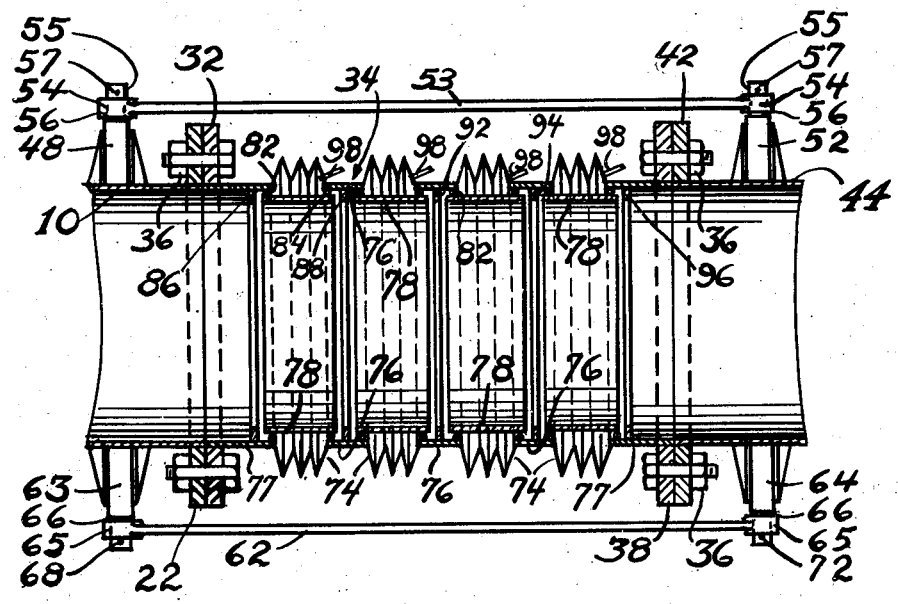
FIG.—2

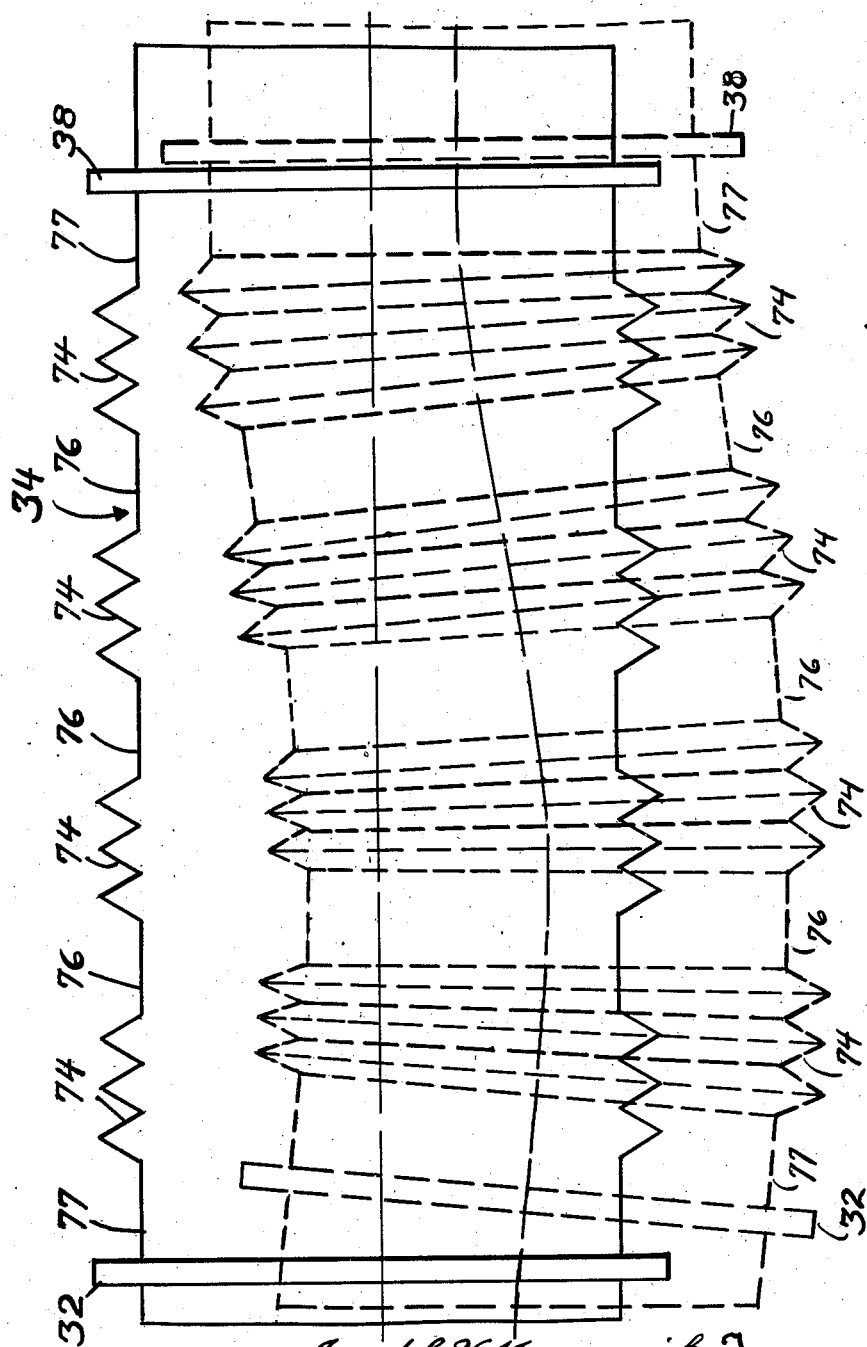

2,404,447

UNITED STATES PATENT OFFICE 2,404,447

EXPANSION JOINT

Joseph V. Marancik, Roselle, and David E. MacClymont, Newark, N. J., assignors to Standard Oil Development Company, a corporation of Delaware Application April 17, 1943, Serial No. 483,456

2 Claims. (Cl. 285—90)

This invention relates to expansion joints and more particularly to expansion joints of the bellows type.

In the equipment used in high temperature processes it is necessary to use expansion joints in the piping systems to take care of expansion and contraction due to differences in temperature. It is especially difficult to use expansion joints where pipes or conduits are provided with angular sections. In such cases heretofore it was necessary to provide anchors, supports and guides which limited the amount of angular and lateral movements of the pipes or conduits and these anchors, supports and guides absorbed the thrust imposed by the working pressure developed on expansion of the parts. The anchors or supports transmitted the thrust or force to the supporting structure.

According to our invention an expansion joint is provided with a linkage arrangement which absorbs all forces and eliminates costly anchors, guides and supports heretofore necessary to absorb working pressures and expansion forces. Our improved expansion joint permits angular and/or lateral movement of a pipe line or system where such pipe line is provided with angular members such as elbows, etc. Our invention is particularly described in connection with a 90° angular pipe but it is to be understood that this is by illustration only and may be used with pipe lines having other angles greater than or smaller than 90°.

In the preferred form the linkage arrangement is pivotally connected to the ends of the pipe line separated by an expansion joint and comprises two rods or bars on opposite sides of the pipe line so that the rods or bars bridge the expansion joint. One end of each rod or bar is connected to the pipe line on one side of the expansion joint and the other end of each rod or bar is connected to the pipe line on the other side of the expansion joint so that the rods bridge the expansion joint on opposite sides thereof.

When the pipe line is cold the expansion joint and the pipe line take one position and when the pipe line is hot the expansion joint and pipe line take another position. In the hot and cold positions the linkage arrangement absorbs the angular and lateral forces due to the expansion and contraction and transmits such forces to the pipe line or system itself. Further, some of the stresses are due primarily to the weight and position of the pipe lines. In addition, stresses arise due to the internal pressure of the fluid in the pipe lines. In moving from cold to hot position or vice versa there is substantially no relative rotation between the pipe sections connected by the expansion joint. There is relative lateral movement of the pipe sections and angular movement of the angular pipe section or sections attached to the expansion joint.

Our expansion joint is especially adapted for large diameter pipes or tubes in installations using long lengths of pipe where relatively high temperatures are encountered.

In the drawings:

Fig. 1 represents an elevation of a portion of a piping system including an expansion joint and showing the position of the pipe and expansion joint in hot and cold positions.

Fig. 2 is a vertical cross-section of the expansion joint taken substantially along line II—II of Fig. 1 and including the linkage arrangement; and Fig. 3 is an enlarged elevation of the expansion joint showing the positions that the sections of the expansion joint take in hot and cold positions with the linkage arrangement and other parts omitted to facilitate the disclosure.

Referring now to the drawings, the reference character 10 designates an angular section of piping 10. The section 10 of piping is anchored or supported at its lower portion by means diagrammatically shown at 12. Where a large piping system is used the section 10 is anchored to the supporting steel structure. The angular section 10 has a right angle or bend shown at 18 and a flange 22 at its upper end.

In Figs. 1 and 3 of the drawings the full line position shows the piping system and the expansion joint in the hot position whereas the dotted line position is used to indicate the position the parts take when the apparatus is cold with the expansion joint distorted. This arrangement is preferred for the reason that when the piping system is in use the parts assume the straight line shown in full lines rather than the off-set position of the parts in dotted lines. In this way better flow is obtained when the apparatus is being used. In the dotted line position it will be seen that the section 10 assumes an angular position around the anchor or support 12.

Secured to the upper flange 22 on the section 10 is a flange 32 of the expansion joint 34 having its expansible and contractible sections diagrammatically shown in Fig. 1. The flanges are held together by bolts or the like 36 shown in Fig. 2. On the other end of the expansion joint is a second flange 38 which is secured to the flange 42 on another pipe section 44 by bolts or the like 36. The expansion joint comprises a plurality of expansible and contractible sections which will be more fully described hereinafter.

A vessel or container (not shown) may be supported a distance below section 10 by the supporting structure and connected with section 10 by other pipe sections and one or more expansion joints. Or, the pipe sections may otherwise communicate with vessels or with other pipe sections so that only a pipe system is used. If a vessel is used it may be provided with an inlet and an outlet.

In order to absorb working stresses and pressures in the piping system itself so as to avoid the use of anchors, supports or guides we have connected the ends of the pipe sections 10 and 44 by rods or links placed on opposite sides of the expansion joint. A base member 48 is fixedly attached to the end of pipe section 10 and extends therefrom adjacent the flange 22. Another base member 52 is fixedly attached to pipe section 44 and extends therefrom adjacent flange 42. A rod or link 53 is provided with openings 54 at its ends (see Figs. 1 and 2) which are fitted over the upper portions 55 of the base members 48 and 52 and rest on shoulders 56 thereon. Cotter pins or the like 57 are used to hold the link or bar 53 in position. The bar 53 is rigid so that it permits relative vertical and lateral movement of the connected pipe sections 10 and 44. The openings in the ends of the bar 53 form a pivotal connection with the base members 48 and 52.

On the opposite side of the expansion joint 34 another bar 62 is provided which is similar to the bar 53 above described. Base members 63 and 64 are attached to the ends of the pipe sections 22 and 44, respectively, in a manner similar to that described above in connection with base members 48 and 52. The bar 62 is rigid and is provided with openings 65 at its ends which fit over the base members 63 and 64 to provide a pivotal connection therewith. Shoulders 66 are provided on base members 63 and 64. A cotter pin or other fastening means 68 is provided for holding one end of the rod or bar 62 on the base member 63 and another cotter pin or securing means 72 is provided for the other end of the bar 62 for holding the bar or rod on the other base member 64. The base members are of such a height so that when the rods 53 and 62 are in position, the rods or bars 53 and 62 bridge the expansion joint 34 and the flanges 22, 32, 38 and 42 on the pipe sections connected by the expansion joint.

Referring now to the expansion joint itself, it will be seen that the expansion joint comprises a plurality of separate expansible and contractible metal elements 74 which are separated by metal sleeves 76. Instead of using the expansion joint shown, other expansion joints comprising continuous corrugations or bellows may be used. In the form of expansion joints shown in the drawings the expansible and contractible sections 74 are securely attached to the ends of sleeves 76. The end expansible and contractible sections 74 are attached to sleeves 77 which carry the flanges 32 and 38 of the expansion joint.

To prevent the fluid which passes through the piping system from entering the expansible and contractible sections, an internal metal sleeve 78 is provided for each expansible and contractible section. These sleeves are each provided with spaced annular raised or rib portions 82 and 84 on the circumference which form a relatively tight seal between the internal sleeve members 78 and respective sleeve portions 76 and 77 of the expansion joint. In order to prevent displacement of the sleeves 78 during operation of the expansion joint internal annular fixed abutments 86, 88, 92, 94 and 96 are provided. The internal annular abutments 86 and 96 are securely attached to the internal surface of end sleeve portions 77 of the expansion joint. The abutments 88, 92 and 94 are securely attached to the internal surface of the intermediate sleeve portions 76. The internal sleeve portions 78 and the raised annular ribs or portions 82 and 84 on the sleeve portions do not form part of our invention and are being covered in a separate application. In order to prevent entry of fluids or powder into the expansible and contractible sections 74, inert gas such as steam or other suitable gas, etc., is bled into each of the sections 74 through lines 98.

Our invention is especially adapted for expansion joints used with angular sections in a piping system. Where angular sections are used, the ends of the pipe sections follow different paths and heretofore it has been necessary to use anchors or guides to guide the sections and to transmit the expansion and contraction forces or stresses to the steel structure. In our invention the stresses and forces are absorbed by the links or bars and transmitted to the pipe sections themselves and guides or anchors are not necessary. As shown in Fig. 1 it will be seen that the ends of the pipe sections 10 and 44 are at different heights and in different positions. Due to the relative movements of the ends of the pipe sections 10 and 44 the expansion joint assumes the different positions shown in Fig. 1. The different positions are shown in slightly exagerated form to illustrate the operation of the expansion joint.

In Fig. 3 we have shown the position of the expansion joint when it is cold and when it is in heated expanded condition. The showing is enlarged to facilitate the disclosure. The full line position in Fig. 3 shows the position of the expansion joint when it is being used in high temperature work. The dotted line irregular position shows the relative positions of the expansible and contractible elements when the expansion joint is cold. In the dotted line position it will be seen that the top of the first expansible and contractible element 74 at the left is contracted whereas the bottom of the same element is expanded. The reverse is true of the expansible and contractible element 74 shown at the right in Fig. 3. The intermediate expansible and contractible sections show the other positions that these expansible and contractible sections take in the cold position.

In the operation of our invention the linkage arrangement absorbs all stresses in the pipe sections in hot and cold positions and transmits the stresses directly to the pipe sections. Some of the stresses are produced by temperature changes and others are due to the weight and position of the pipe lines. Other stresses result from the internal pressure of the fluid carried in the pipe line. For example, with a 72 inch pipe line and with a pressure of 10 lbs. per sq. in. on the fluid in the pipe line, the force is equal to the area of the pipe line multiplied by 10 and this is equal to about 40,000 lbs. This internal or working pressure is absorbed entirely by the linkage arrangement.

Our invention is especially adapted for use in equipment dealing with the treating and conversion of hydrocarbons and in catalytic treating or conversion of hydrocarbons using powdered catalyst but our invention is not restricted thereto as it may be used in any piping systems having angular sections where temperature changes are encountered. In the cracking of hydrocarbons temperatures between about 700° F. and 1100° F. or higher are used and in the regeneration of powdered catalyst temperatures as high as 1400° F. may be used. With such high temperatures the expansion of the piping system becomes a large factor and one of the problems in existing equipment was concerned with the development of suitable expansion joints which could be used under these conditions. Also, in the catalytic cracking of hydrocarbons using powdered catalyst the pipe sections 22 and 44 are large conduits or pipes and may be as large as 8 feet in diameter. With such large pipes and high temperatures our expansion joint with the linkage arrangement operates to produce the results above described.

Instead of pivotally mounting the rods or links 53 and 62 on the pipe sections, it is within the contemplation of our invention to pivotally mount the rods or links 53 and 62 on the expansion joint itself, as for example, on end sleeve portions 77 or on flanges 32 and 38.

While one form of our invention has been shown in the drawings and another form described, it is to be understood that these are by way of illustration only and various changes and modifications may be made without departing from the spirit of our invention.

We claim:

1. In a piping system wherein an angular pipe section is pivotally held adjacent one end and its other end is connected with another pipe section by a heat responsive corrugated metal expansion joint and the adjacent ends of said pipe sections take different positions due to temperature changes, a linkage arrangement pivoted to the ends of the two pipe sections and spanning the expansion joint to provide for relative movement between the adjacent ends of said pipe sections due to changes in temperature and to absorb pipe stresses including those due to expansion or contraction of said pipe sections due to changes in temperature, said relative movement being in a plane substantially perpendicular to the pivotal axis of said linkage, said linkage arrangement being disposed outside the path of movement of the ends of said pipe sections.

2. In a pipe system according to claim 1 characterized in that the linkage arrangement comprises links pivotally secured on opposite sides of said expansion joint.

JOSEPH V. MARANCIK.
DAVID B. MacCLYMONT.